United States Patent Office 3,645,924
Patented Feb. 29, 1972

3,645,924
PROCESS FOR PREPARING FLEXIBLE POLY-
URETHANE FOAMS AND POLYURETHANE
COATINGS
Adolf Wojciech Fogiel, Wilmington, Del., assignor to
E. I. du Pont de Nemours and Company, Wilmington,
Del.
No Drawing. Continuation-in-part of application Ser. No.
814,434, Apr. 8, 1969, which is a continuation-in-part
of application Ser. No. 765,034, Oct. 4, 1968. This
application Feb. 3, 1970, Ser. No. 8,420
Int. Cl. C08g 22/24, 22/36
U.S. Cl. 260—2.5 AC                                    18 Claims

ABSTRACT OF THE DISCLOSURE

Aliphatic isocyanate based polyurethane foams and coatings. The foams are prepared from aliphatic polyisocyanates, polyols and water in quasi-prepolymer, full prepolymer or one-shot systems using a 2-substituted-1,1,3,3-tetraalkyl guanidine catalyst. The coatings are conventional isocyanato-terminated polyurethane prepolymers cured with moisture in the presence of a 2-substituted-1,1,3,3-tetraalkyl guanidine.

RELATED APPLICATIONS

This application is a continuation-in-part of copending application Ser. No. 814,434 filed Apr. 8, 1969 which is a continuation-in-part of copending application Ser. No. 765,034 filed Oct. 4, 1968 both of which applications are now abandoned.

BACKGROUND OF THE INVENTION

The manufacture of flexible cellular polyurethane products or foams and polyurethane moisture-cure coatings are well-established industries. Flexible foams are prepared by reacting an organic isocyanate with one or more active hydrogen-containing compounds such as polyether polyols, polyester polyols or polyamines in the presence of a blowing agent. Moisture-cure polyurethane coatings are solutions of isocyanato-terminated prepolymers which cure or dry on exposure to air by reaction of free isocyanato groups with atmospheric moisture.

In recent years a large body of art relating to the preparation of flexible foams has developed. For the most part, this information relates to the use of aromatic diisocyanates, particularly tolylene diisocyanate. While flexible foams which have excellent physical properties can be readily prepared from aromatic isocyanates, they are generally subject to discoloration upon exposure to heat and light. Discoloration is especially troublesome in applications where aesthetic qualities are important such as in wearing apparel, drapery linings and furniture.

It is known that polyurethane products based on aliphatic isocyanates are more resistant to discoloration than those prepared from aromatic isocyanates. The skilled worker would therefore be led to the use of aliphatic isocyanates in the preparation of non-discoloring foams. However, the use of aliphatic isocyanates in preparing flexible foams has not been successful in terms of process operability and foam properties. Thus, when tolylene diisocyanate has been replaced with aliphatic diisocyanates in commercial processes regularly used for flexible urethane foam manufacture good results have not been achieved even though increased catalyst concentrations are used to compensate for the lower reactivity of aliphatic isocyanates. To illustrate: U.S. Pat. 3,352,803 to Hogg et al. discloses the use of conventional foam catalysts in preparing foams from an aliphatic diisocyanate, a triol, water and a source of hydrogen peroxide. In order to foam and cure, the reactants must be heated in an oven for an extended time. The resulting foams, as taught by the examples, have closed cells and high densities (4.0 lbs./cu. ft.). French Pat. 1,481,815 discloses a process for preparing flexible foams in which a polyol, water and an aliphatic diisocyanate are mixed in the presence of an organometallic catalyst. The time required for foaming is relatively long (about seven minutes) unless heat is supplied, and the densities of the disclosed foams are about 4 lbs./cu. ft. or higher.

In contrast, high quality tolylene diisocyanate open-cell foams having densities of about 2 lbs./cu. ft. can be prepared by prepolymer or one-shot processes in which the ingredients are mixed at about room temperature, and within practically short periods, are fully formed and sufficiently cured to permit handling of the foam. Such processes readily lend themselves to efficient continuous foam production. As discussed above, however, such aromatic isocyanate foams are subject to discoloration.

Aliphatic isocyanate-based moisture-cure polyurethane coatings are achieving widespread use in applications such as floor coverings and finishing for wood because of their resistance to discoloration. Their acceptance, however, has been limited because of the sluggishness of aliphatic isocyanato groups in reacting with atmospheric water to cure and harden the coating.

SUMMARY OF THE INVENTION

This invention provides processes for preparing aliphatic-isocyanate based open-cell flexible foam and polyurethane moisture-cure coatings. The foams are prepared by reacting a polyester or polyether polyol having an average equivalent weight of at least about 500 and 1–10 parts by weight of water per 100 parts of polyol with 0.7–1.3 equivalents of an aliphatic polyisocyanate per equivalent of water plus polyol, said process being carried out such that the water-isocyanato group reaction occurs in the presence of 0.05–10 parts by weight per 100 parts of polyol plus polyisocyanate of at least one substituted guanidine of the formula

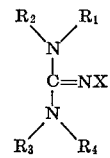

wherein $R_1$, $R_2$, $R_3$ and $R_4$ are independently $C_1$–$C_4$ alkyl, substituted $C_1$–$C_4$ alkyl wherein the substituents are $C_1$–$C_4$ alkoxy, or the radicals in one or both of the pairs $R_1$–$R_2$ and $R_3$–$R_4$ are joined together to form a 5 to 7 membered ring consisting of carbon atoms and not more than 2 hetero atoms, including the guanidine nitrogen atom, from the group consisting of nitrogen, sulfur and oxygen and X is phenyl or substituted phenyl wherein the substituents are one or more $C_1$–$C_{12}$ alkyl groups or $C_1$–$C_4$ alkoxy groups, or X is an alkyl radical of the formula

wherein $R_5$, $R_6$ and $R_7$ are independently hydrogen, $C_1$–$C_4$ alkyl or substituted $C_1$–$C_4$ alkyl wherein the substituents are phenyl, $C_1$–$C_{12}$ alkyl phenyl, $C_1$–$C_4$ alkoxy phenyl, $C_1$–$C_4$ alkoxy, $C_6$–$C_{15}$ aryloxy, nitrile, or carboalkoxy or $R_7$ can additionally be $C_5$–$C_{18}$ alkyl, phenyl, substituted phenyl or $C_1$–$C_4$ alkoxy, or the radicals in one or two of the pairs $R_5$–$R_6$, $R_5$–$R_7$ and $R_6$–$R_7$ are joined together to form a 5 to 7 membered ring consisting of carbon atoms and not more than one hetero atom from the group consisting of nitrogen, sulfur and oxygen.

The moisture cure coatings are prepared by reacting about 1.4–2.1 equivalents of an aliphatic polyisocyanate with about 1 equivalent of at least one polyol to prepare an isocyanato terminated prepolymer, introducing about 0.05–2.0% by weight, based on the total weight of the prepolymer plus added solvents, of a substituted guanidine catalyst as described above and applying the solution of said prepolymer and catalyst in an inert solvent to a substrate whereupon the free isocyanato groups react with atmospheric water to cure the coating.

DETAILED DESCRIPTION

The term "equivalent" means chemical equivalent weight. The stoichiometry and equivalents of materials indicated herein are based solely on the reaction of hydroxy groups and water with isocyanato groups to prepare the foams and coatings of this invention and assume, as is well accepted in the art, that one free hydroxy group reacts with one free isocyanato group and one molecule of water reacts with two free isocyanato groups.

The catalysts used in this invention are substituted guanidines of the formula

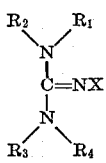

wherein $R_1$, $R_2$, $R_3$ and $R_4$ are independently $C_1$–$C_4$ alkyl, substituted $C_1$–$C_4$ alkyl wherein the substituents are $C_1$–$C_4$ alkoxy, or the radical in one or both of the pairs $R_1$–$R_2$, and $R_3$–$R_4$ are joined together to form a 5 to 7 membered ring consisting of carbon atoms and not more than 2 hetero atoms including the guanidine nitrogen atom, from the group consisting of nitrogen, sulfur and oxygen and X is phenyl or substituted phenyl wherein the substituents are $C_1$–$C_{12}$ alkyl or $C_1$–$C_4$ alkoxy or X is an alkyl radical of the formula

wherein $R_5$, $R_6$ and $R_7$ are independently hydrogen, $C_1$–$C_4$ alkyl or substituted $C_1$–$C_4$ alkyl wherein the substituents are phenyl, $C_1$–$C_{12}$ alkyl phenyl, $C_1$–$C_4$ alkoxy phenyl, $C_1$–$C_4$ alkoxy, $C_6$–$C_{15}$ aryloxy, nitrile or carboalkoxy, or $R_7$ can additionally be $C_5$–$C_{18}$ alkyl, phenyl, substituted phenyl or $C_1$–$C_4$ alkoxy, or the radicals in one or two of the pairs $R_5$–$R_6$, $R_5$–$R_7$ and $R_6$–$R_7$ are joined together to form a 5 to 7 membered ring consisting of carbon atoms and not more than one hetero atom from the group consisting of nitrogen, sulfur and oxygen.

Representative substituted guanidines include 2-phenyl-1,1,3,3-tetramethylguanidine,
2-(4-dodecylphenyl)-1,1,3,3-tetramethylguanidine,
2-(4-methoxyphenyl-1,1,3,3-tetrabutylguanidine,
1,1,2,3,3-pentamethylguanidine,
2-n-butyl-1,1,3,3-tetramethylguanidine,
2-cyclohexyl-1,1,3,3-tetramethylguanidine,
2-n-decyl-1,1,3,3-tetramethylguanidine,
2-n-dodecyl-1,1,3,3-tetramethylguanidine,
2-butyl-1,1,3,3-tetramethylguanidine,
2-tert-butyl-1,1,3,3-tetramethylguanidine,
2-(β-cyanoethyl)-1,1,3,3-tetramethylguanidine,
2-(β-carbooctoxyethyl)-1,1,3,3-tetramethylguanidine,
2-(β-carbobutoxyethyl)-1,1,3,3-tetramethylguanidine,
2-(β-phenethyl)-1,1,3,3-tetrapropylguanidine,
2-benzyl-1,1,3,3-tetrabutylguanidine,
2-(3-phenoxypropyl)-1,1,3,3-tetraethylguanidine,
2-(β-ethoxyethyl)-1,1,3,3-tetramethylguanidine,
2-butoxymethyl-1,1,3,3-tetramethylguanidine,
2-(tetrahydro-2-thienyl)-1,1,3,3-tetramethylguanidine,
2-(octahydro-4a-benzothiopyranyl)-1,1,3,3-tetramethylguanidine,
2-(octahydro-4a-benzopyranyl)-1,1,3,3-tetramethylguanidine,
2-(tetrahydrofurfuryl)-1,1,3,3-tetramethylguanidine,
2-(decahydro-4a-naphthyl)-1,1,3,3-tetramethylguanidine,
2-(3-piperidyl)-1,1,3,3-tetramethylguanidine,
2-(decahydro-4a-quinolyl)-1,1,3,3-tetramethylguanidine,
dipiperidino-N-methylmethylene imine,
dimorpholino-N-methylmethylene imine,
dithiomorpholino-N-methylmethylene imine,
dipiperazine-N-methylmethylene imine,
N-methyl-C-piperidino-C-dimethylamino methylene imine,
N-methyl-C-morpholino-C-dimethylamino methylene imine,
N-methyl-C-thiomorpholino-C-dimethylamino methylene imine, and
N-methyl-C-piperazino-C-dimethylamino methylene imine.

Of these compounds the 2-cyclohexyl-, 2-n-decyl- and 2-n-dodecyl-substituted 1,1,3,3-tetramethylguanidines are preferred catalysts in preparing foams because they generally yield foams having very low compression set without heat curing. The preferred catalysts of this invention also have greater versatility in terms of the range of reactants with which they can be used than do some of the other catalysts such as pentamethylguanidine. The 2-decyl- and 2-dodecyl-derivatives are particularly outstanding in this respect and are new compounds the preparation of which is exemplified hereinafter. 2-cyclohexyl-1,1,3,3-tetramethylguanidine is described in Belgian Pat. 637,357.

Pentasubstituted guanidines of the above formula wherein $R_1$, $R_2$, $R_3$ and $R_4$ are independently $C_1$–$C_4$ alkyl and X is

wherein $R_5$ and $R_6$ are independently hydrogen or $C_1$–$C_4$ alkyl and $R_7$ is $C_6$–$C_{18}$ alkyl are also new compounds.

The required substituted guanidines can be prepared by a variety of known methods. These include (1) alkylation of 1,1,3,3-tetraalkylguanidine with alkylating agents such as dialkyl sulfates, alkyl iodides and esters of p-toluenesulfonic acid, (2) addition of 1,1,3,3-tetraalkylguanidines to activated carbon-carbon double bonds such as contained in acrylonitrile and acrylate esters, and (3) condensing a primary aliphatic or primary aromatic amine with N,N,N'-N'-tetraalkylurea in the presence of phosphorus oxychloride by the method described for aromatic amines in Ber. 94 2278 (1961). The last method has wide application because of the variety of primary amines which are available and has been found to be applicable to aliphatic as well as aromatic amines as indicated above.

In foam preparation the substituted guanidine catalyst is employed in the amount of about 0.05–10 parts by weight per 100 parts of isocyanate plus polyol. The exact amount to be used depends on the reactivity of the isocyanate used, the scale of the foaming operation and the rate of reaction desired, but can be routinely determined by one skilled in the art. When a foam is prepared from 4,4'-methylenebis(cyclohexyl isocyanate) by a prepolymer procedure on a small scale, about 1 part by weight of the preferred catalyst per 100 parts of isocyanate and polyol is necessary to give a foam rise time of about 1.5 minutes. In large scale continuous operation, the amount of catalyst can be reduced to 0.2–0.4 part to obtain a similar rise time.

The substituted guanidine catalysts are very active in catalyzing the water-aliphatic isocyanate reaction. The water-isocyanate reaction is preferentially catalyzed when both polyol and water are present in the same system. Thus, the formation of urea groups is favored over the formation of urethane groups. For this reason when the process of this invention is carried out by a one-shot procedure, urethane forming catalysts such as organotin compounds, e.g., dibutyl tin dilaurate, organic acid salts of divalent tin, e.g., stannous octoate and tertiary amines, e.g., triethylene diamine should be used. The active catalysis of the water-aliphatic isocyanate reaction is an important aspect of this invention since heretofore a principal deterrent to successful preparation of aliphatic isocyanate foams has been that the water-aliphatic isocyanate reaction proceeded too slowly to effectively expand the foam formulation. Consequently, the resulting foams have been of high density and were slow in forming. This has been true even when prior art catalysts were employed which vigorously promote the water-aromatic isocyanate reaction.

When the substituted guanidines described above are employed in the one-shot, prepolymer or quasi-prepolymer systems of this invention using water as an expanding agent, the formulations are expanded to form foams of low density in a reasonably short foaming time. This discovery makes possible the practical preparation of high quality aliphatic isocyanate based foams which do not require heat curing for the development of good physical properties such as compression set.

The polyols which can be used in foam preparation are the polyalkyleneether and polyester polyols having an average equivalent weight of at least about 500. The preferred polyol equivalent weight is from about 900–1500. It is also preferred that the hydroxy groups of the polyol be attached to primary carbon atoms because of their greater reactivity; however, secondary hydroxy groups can also be present. The use of polyols with primary hydroxyls is especially preferred when foams are prepared by one-shot or quasi-prepolymer procedures.

Representative hydroxy-terminated polyethers include polyalkyleneether polyols prepared by polymerization or copolymerization of cyclic ethers such as ethylene oxide, propylene oxide, trimethylene oxide, and tetrahydrofuran, or by the polymerization or copolymerization of one of these cyclic ethers in the presence of polyhydric alcohols such as alkanediols or aliphatic polyols, such as ethylene glycol, propylene glycol, 1,3-butanediol, glycerol, 2-ethyl-2-(hydroxymethyl)-1,3-propanediol (commonly called trimethylolpropane) or sorbitol. Suitable polyesters include the hydroxy-terminated polyesters prepared from dicarboxylic acids and aliphatic dihydroxy compounds. Representative examples of dicarboxylic acids which can be used include succinic acid, glutaric acid, adipic acid and benzenedicarboxylic acids. Examples of suitable hydroxy compounds are ethylene glycol, propylene glycol, 1,3-butanediol, 1,4-butanediol, diethylene glycol, 2,2-dimethyl-1,3-propanediol, and 1,6-hexanediol. Polyesters having an average of more than two hydroxy groups can be prepared similarly by using one or more reactants having more than two functional groups. Mixtures of polyols can also be used. Polyether and polyester polyols containing at least about 2.2 hydroxy groups per molecule give best results in terms of good physical properties of the foams and are therefore preferred.

The term "aliphatic polyisocyanate" as used herein includes any organic polyisocyanate in which the isocyanato groups are attached to saturated carbon atoms. Cycloaliphatic polyisocyanates and polyisocyanates containing aromatic rings such as xylylene diisocyanate can be used provided they meet the limitation stated above. Representative aliphatic polyisocyanates include 1,4-tetramethylene diisocyanate,
1,6-hexamethylene diisocyanate,
2,2,4-trimethyl-1,6-hexamethylene diisocyanate,
m- and p-xylylene diisocyanates,
α,α,α,α-tetramethyl-p-xylylene diisocyanate,
3-isocyanatomethyl-3,5,5-trimethylcyclohexyl isocyanate,
phenylenebis(2-ethyl isocyanate),
4-methyl-1,3-cyclohexylene diisocyanate,
2-methyl-1,3-cyclohexylene diisocyanate,
4,4'-methylenebis(cyclohexyl isocyanate) and
2,4'-methylenebis(cyclohexyl isocyanate).

In addition, aliphatic diisocyanates which contain ester linkages can be used. Illustrative of such isocyanates are bis(2-isocyanatoethyl)carbonate, bis(2 - isocyanatoethyl) fumarate, bis(2-isocyanatoethyl)-4-cyclohexene-1,2-dicarboxylate and lower alkyl esters of 2,5-diisocyanatovaleric acid. Polyisocyanates containing three or more isocyanato groups per molecule such as 2,4-bis(4-isocyanatocyclohexylmethyl)cyclohexyl isocyanate can also be used but preferably only in small quantities in combination with diisocyanates. The preferred isocyanate is 4,4'-methylenebis(cyclohexyl isocyanate) (PICM) because of the high quality foams it gives and its relatively low volatility. Isomeric mixtures of PICM which are liquid at room temperature are particularly preferred because of their handling convenience in foam formulations. Such liquid PICM mixtures contain less than 26% trans-trans isomer and less than 75% cis-cis isomer. They are prepared by phosgenating the corresponding 4,4'-methylenebis(cyclohexyl amine) (PACM) isomeric mixtures by procedures well known in the art, cf. U.S. Pats. 2,644,007, 2,680,127 and 2,908,703. The PACM isomer mixtures which upon phosgenation yield liquid PICM are also well known in the art, and can be obtained by hydrogenation of methylenedianiline under mild conditions and/or by fractional crystallization of PACM isomer mixtures in the presence of water and alcohols. In general, polyisocyanates which are liquid at room temperature are preferred since the process of this invention is most conveniently operated when all the materials are at or slightly above room temperature. If the isocyanate used is a solid at room temperature, the reaction must be carried out at a higher temperature at which the isocyanate is liquid.

Foams can be prepared by the present process by following substantially conventional techniques for water-blown flexible polyurethane foams with the exception of the requirement for the substituted guanidine catalysts described hereinbefore. One-shot, quasi-prepolymer and prepolymer procedures can be employed. These variations are well known and are described in Chapter VII of "Polyurethanes: Chemistry and Technology," Part II, Saunders and Frisch, Interscience Publishers, 1964.

A preferred procedure for carrying out the process of this invention employs two stages. In step 1 an isocyanato-terminated prepolymer is prepared by reacting about one equivalent of the polyol with about 2.0–10.5 ($x$) equivalents of aliphatic isocyanato groups. The prepolymer can be prepared by conventional techniques used in preparing aromatic isocyanate foams, although allowance should be made for the lower reactivity of aliphatic isocyanates. If less isocyanate than that indicated above is used, the viscosity of the prepolymer may be too high for proper foaming. This is particularly true with polyester polyols for which the ratio of isocyanato groups to hydroxyl groups is preferably above 2.5. Mixing of the polyisocyanate and polyol should be carried out without undue delay. It is desirable to add the polyol to the polyisocyanate to minimize chain-extension and maintain the prepolymer viscosity at a low level. The course of prepolymer formation can be conveniently followed by periodically determining the isocyanato group concentration of the reaction mixture until a constant level is reached. Heating the mixture is advisable to accelerate prepolymer formation. Temperatures of about 70–110° C. are preferred. Polyols containing primary hydroxyls require a reaction time of about 1–12 hours at 80–100° C. for prepolymer formation whereas polyols with secondary hydroxyls require at least about 2 to 3 times as long. Prepolymer formation can also be hastened by adding small amounts of urethane forming catalysts, if desired. Representative of such urethane forming catalysts are dibutyl tin dilaurate, organic acid salts of zinc and lead and triethylene diamine.

In step 2 of the preferred process of this invention, the prepolymer from step 1 is mixed with from about 0.1 additional equivalents of polyol, about 1–10 parts by weight of water per 100 parts of total polyol used, additional aliphatic polyisocyanate ($y$ equivalents) if needed, and from about 0.05–10 parts by weight of the catalyst per 100 parts by weight of isocyanate plus polyol used in the process. Sufficient aliphatic isocyanate is added in steps 1 and 2 ($x+y$ equivalents) to give from about 0.7–1.3 equivalents of isocyanato groups per equivalent of hydroxy groups plus water used in the process. Thus, if sufficient isocyanate is added in step 1 to meet this requirement there is no need for additional isocyanate in step 2. A variety of procedures can be used in adding the ingredients in step 2 to the prepolymer. The isocyanate can be first added in a separate step followed by addition of the polyol, water and catalyst, or all of the components can be added simultaneously. If desired, all of the components but the catalyst can be added and allowed to stand for a short time (usually not longer than a few minutes) followed by addition of the catalyst. Whatever the procedure used, once the catalyst has been mixed with the prepolymer, all other components should also be present.

When the polyol is a polyester, it is preferred to employ the quasi-prepolymer process in which the polyol is added in both steps 1 and 2, otherwise, the prepolymer becomes too viscous for convenient handling. Preferably, at least about 40–90% by weight of the polyester is added in step 1. It is generally advantageous to add less than all of the isocyanate in step 1 to allow later adjustment of the isocyanate content. As indicated above, this two stage procedure yields foams having better physical properties than does a one-shot procedure in which the polyisocyanate, polyols and water are reacted substantially simultaneously.

In preparing foams by the process of this invention, the amount of water to be used will be largely dictated by the density of foam desired. Generally, about 2–5 parts by weight of water per 100 parts of polyol are preferred which gives foam of about 2 lbs./cu. ft. density. Greater amounts of water yield foams of lower density and lesser amounts give foams of greater density as is well known in the art. If desired, small amounts of other blowing agents such as trichlorofluoromethane and methylene chloride can be used in conjunction with water to expand the foams. In such cases the amount of water needed to yield a foam of a given density will be slightly less, however, the amount of water used should not be less than about 1 part by weight per 100 parts of polyol.

In preparing foams by the process of this invention it is usually desirable to employ a surfactant or combination of surfactants to obtain uniform cell structure in the final product. Polydimethylsiloxanepolyalkyleneether block copolymers which are regularly employed in the preparation of polyurethane foams are suitable in most instances when used at levels of about 0.1–3.0 parts per 100 parts of polyol. Either hydrolytically stable block copolymers, of which $C_4H_9O(C_2H_4O)_{46}(C_3H_6O)_{34}$—$CH_2CH(OH)CH_2O$
$(CH_2)_3Si(CH_3)_2O[Si(CH_3)_2O]_{20}Si(CH_3)_2$—$(CH_2)_3$—
$OCH_2CH(OH)CH_2(OC_3H_6)_{34}(OC_2H_4)_{46}OC_4H_9$ (disclosed in Canadian Patent 669,881) is illustrative, or block copolymers subject to slow hydrolysis such as

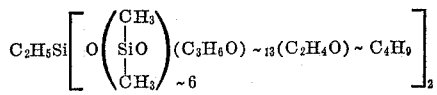

(disclosed in U.S. Pat. 2,834,748) is satisfactory. Other nonionic surfactants which may be useful on occasion include materials such as polyoxypropylene-polyoxyethylene block copolymers, polyethoxylated vegetable oils and polyethoxylated monoesters of sorbitol and fatty acids. Anionic surfactants of which sulfonated castor oil and sodium dioctyl sulfosuccinate are illustrative, are also useful, particularly in polyester systems. In addition, small amounts of silicone oils, such as polydimethylsiloxane, 50 centistoke grade, can be used to improve cell opening, but they are not required. Other additives such as antioxidants, stabilizers, U.V.-screening agents, plasticizers, pigments and fillers can be added to the foam formulations of this process, if desired. One can also employ conventional amine or tin foam catalysts in this process along with the required substituted guanidine catalyst. Cell regulators, such as N,N-dimethylformamide, N-methylpyrrolidone-2, tetramethylene sulfone and dimethylsulfoxide may be useful in increasing the opening of the cells of the foams. Such cell regulators also often significantly increase the efficiency of the catalysts of this invention. The use of cell regulators in preparing open-cell, skeletal foams is described in U.S. Pat. 3,210,300 to Leibu and Tufts, issued Oct. 5, 1965. Other conventional steps such as heating to improve the compression set can also be employed.

The process of this invention makes possible the efficient continuous preparation of flexible foams based on aliphatic polyisocyanates. Because of the activity of the catalyst employed, the ingredients can be mixed at room temperature. Foam formation can be completed about as rapidly as for tolylene diisocyanate systems, i.e., about 2 minutes. Crushing is not necessary to obtain open-cell foams. Foams having densities of about 2 lbs./cu. ft. can be readily prepared. When the preferred catalysts are employed, it is not necessary to oven-cure the resulting foams in order to obtain foams having good physical properties including tensile strength and compression set. The foams are also non-discoloring when the components other than the aliphatic polyisocyanate used are non-discoloring.

Moisture-cure, one-package polyurethane coating compositions generally are solutions of isocyanato-terminated prepolymers which cure or dry on exposure to air by reaction of free isocyanato groups with atmospheric water. By properly selecting the polyols used in preparing the prepolymer and the ratio of isocyanato groups to hydroxyl groups, the physical properties of the dry film produced can be varied over a considerable range. In moisture-cure coating compositions based on aliphatic isocyanates, the time required for drying is frequently so extended that the use of such coatings is inconvenient. Because of the exceptional capacity of the catalysts of this invention to catalyze the reaction of aliphatic isocyanato groups with water, the rate of drying or curing of moisture-cure coatings derived from aliphatic polyisocyanates can be greatly accelerated by adding relatively minor amounts of the substituted guanidines described hereinbefore.

Any of the aliphatic polyisocyanates described hereinbefore can be used to prepare moisture-cure coatings according to this invention.

The diols and polyols which can be used include a wide range of materials well known to those skilled in the art of polyurethane coatings. Included are the polyalkyleneether polyols and polyester polyols both of which can be obtained as described above. These polyols should generally meet the functionality and equivalent weight requirements indicated below. Non-polymeric low molecular weight polyols, i.e., molecular weight below about 350, can be used in admixture with polymeric polyols to advantage on occasion. Representative of such materials are ethylene glycol, propylene glycol, diethylene glycol, dipropylene glycol, glycerine, trimethylol propane, hexanetriol-1,2,6 and pentaerythritol.

In preparing moisture-cure coatings, about 1.4–2.1 equivalents of polyisocyanate is used per equivalent of polyol. The functionality of the polyol or mixture of polyols used is generally between 2 and 4 and preferably between 2 and 3. If an isocyanate of functionality greater than 2 is used, the functionality of the polyols usually should be adjusted downward. The average equivalent weight of the polyols should be in the range of about 90–560.

The coating compositions can be prepared by adding an aliphatic polyisocyanate to an anhydrous mixture of polyols and solvent and heating to temperatures up to about 100° C. until the reaction is substantially complete. The order of additions can be reversed if desired. Addition of solvents can be postponed until the prepolymer is formed. Formation of the prepolymer can be hastened by adding small amounts (0.001–0.01%) of organo-tin catalysts such as dibutyltin dilaurate. Any relatively volatile inert organic liquid in which the reactants and products are soluble is suitable as a solvent. By "inert" is meant that the various reactants and products will not react with the solvent. Representative solvents are aromatic hydrocarbons such as toluene and xylene, esters such as ethyl acetate and β-ethoxyethyl acetate, ketones such as methyl ethyl ketone and ethers such as diisopropyl ether. The amounts and types of solvents used depend to a large extent on the viscosity and the rate of evaporation desired for the coating. Usually the amount of solvent added is such that the coating composition contains from about 20–60% by weight of the prepolymer.

A useful general description of moisture-cure coatings can be found in Chapter X of "Polyurethanes: Chemistry and Technology," Part II, Saunders and Frisch, Interscience Publishers, 1964. While much of this discussion relates to coatings based on aromatic polyisocyanates, it is largely applicable to coatings based on aliphatic polyisocyanates if allowances are made for the lower reactivity of aliphatic isocyanato groups.

Any of the substituted guanidines described above for use in preparing foams can be used in moisture-cure coatings. The preferred catalysts are 2-n-decyl- and 2-n-dodecyl - 1,1,3,3 - tetramethylguanidines. The substituted guanidines can be used in amounts of about 0.05% to 2.0% by weight based on the total weight of the coating composition, i.e., prepolymer plus solvents, to effectively accelerate the curing of moisture-cure coating compositions. The exact quantity of catalyst will vary depending on the particular coating composition, the humidity and temperature and the rate of cure desired. Preferred amounts range from 0.2% to 1.0% by weight of total coating composition. In the case of 2-dodecyl-1,1,3,3-tetramethylguanidine, used at a level of 0.5% in a typical coating composition based on 4,4'-methylenebis(cyclohexyl isocyanate), the tack-free time is 42 minutes and the coating reaches a Sward Hardness of 38 in 24 hours at 75° F. (24° C.) and 50% relative humidity. The pot life or workable life of this coating composition after the addition of the dodecyl tetramethyl guanidine catalyst is about 20 hours. The catalysts of this invention should be added to the coating composition shortly before the coating is applied because the useful life of the coating composition is limited in the presence of the catalyst even in the absence of moisture.

Use of the substituted guanidine catalysts in coating compositions of this invention greatly reduces the tack-free time of the coatings. The coatings thus become hard and resistant to marring in a much shorter time than do the coatings of the prior art. The coatings are particularly useful as non-discoloring coverings and finishes for various substrates such as floors and wood.

The invention is illustrated by the following examples wherein parts and percentages are by weight unless indicated otherwise.

EXAMPLE 1

A mixture of 100 parts of a polyether polyol having an equivalent weight of about 1250 (obtained by condensing propylene oxide with trimethylol propane and capping with ethylene oxide so that about 85% of the hydroxyl groups are primary, "Voranol CP–4601") and about 64.7 parts of a liquid mixture of stereoisomers of 4,4'-methylenebis(cyclohexyl isocyanate) containing about 20% trans-trans isomer, 65% cis-trans isomer and 15% cis-cis isomer is prepared at room temperature in an agitated reactor. The mixture is heated to 100° C. and maintained at that temperature for about 4 hours. The resulting prepolymer is cooled to room temperature and stored in dry containers until required. The prepolymer has an —NCO content of about 10.5% and a Brookfield viscosity of about 2000 cps. at 25° C.

Six flexible foam samples are prepared from this prepolymer using different 2-alkyl-1,1,3,3-tetramethylguanidine derivatives as catalysts for the —NCO/water reaction. The foam formulation and procedure are substantially the same in all other respects for the six foam samples. The formulation that is used follows:

| | Parts |
|---|---|
| Prepolymer of this example | 164.7 |
| Methyl p-methoxybenzalmalonate | 1.6 |
| Triisodecyl phosphite | 3.3 |
| Dimethylformamide | 15.0 |
| Surfactant, polydimethylsiloxane-polyalkylene ether block copolymer of the type described in Example 1 of Canadian Patent 669,881 | 0.18 |
| Water | 3.6 |
| 2-alkyl-1,1,3,3-tetramethylguanidine, as shown in Table I. | |

Foams are prepared batchwise by agitating the mixture obtained by adding the ingredients in the order shown in the above formulation for about 12 seconds with a laboratory high-speed mixer (approx. 3000 r.p.m.) and pouring the resulting mass into an open container where it is allowed to foam.

The specific catalysts used, the amount of catalyst used, the rise times observed for foam formation and properties of the resulting foams are presented in Table I which follows.

TABLE I

| Catalyst, 2-alkyl group | Parts | Rise time, sec. | Foam density, lb./cu. ft. | Comp. Set B, percent No cure | Comp. Set B, percent Cured 1 hr. at 120° C. |
|---|---|---|---|---|---|
| n-Butyl | 1.2 | 90 | | 27 | 16 |
| Cyclohexyl | 1.33 | 90 | 2.4 | 28 | 18 |
| n-Decyl | 0.85 | 95 | 2.3 | 20 | 19 |
| n-Dodecyl | 0.68 | 85 | 2.3 | 22 | 20 |
| β-Cyanoethyl | 1.9 | 210 | 2.3 | 83 | 25 |
| β-Carbobutoxyethyl | 2.58 | 60 | 2.4 | 73 | 19 |

During foam preparation, no shrinkage is observed with the exception of the foam prepared using 2-n-butyl-1,1,3,3-tetramethyl guanidine as a catalyst, which foam evidences very slight shrinkage. All of the foams have open cells. The cell size is in the range of 32–64 cells/linear inch. The tensile strength of all the foams by hand test approaches or matches that of a typical commercial foam of similar density prepared from tolylene diisocyanate and a polyoxypropyleneether triol having an equivalent weight of 1000.

As shown by Table I, the compression set of all of the foam samples is excellent after curing for 1 hour at 120° C.; however, the excellent compression set values obtained without any cure in the case of the foams catalyzed by the n-decyl and n-dodecyl derivatives are particularly noteworthy. The compression set method used in this example and examples to follow is ASTM D–1564–64T, Method B, 50% compression for 22 hr. at 70° C. with a 30 minute recovery.

EXAMPLE 2

A prepolymer is prepared by mixing 100 parts of the polyether polyol described in Example 1 with about 56 parts of 3-isocyanatomethyl-3,5,5-trimethylcyclohexyl isocyanate and heating the resulting mixture for about 4 hours at 100° C. The prepolymer has an —NCO content of about 11.3%. A foam sample is prepared by the procedure of Example 1 using the following formulation.

| | Parts |
|---|---|
| Prepolymer of this example | 156.0 |
| Surfactant described in Example 1 | 0.18 |
| Dimethylformamide | 10.0 |
| Water | 3.6 |
| 2-cyclohexyl-1,1,3,3-tetramethyl guanidine | 1.34 |

The rise time of the foam is about 130 seconds. The foam has a density of about 3 lb./cu. ft. It has open cells in the size range of 16–32 cells/linear inch. The compression set of the foam is 49% after curing for 1 hour at 120° C.

A second foam produced by omitting the dimethylformamide in the above formulation and increasing the guanidine catalyst from 1.34 parts to 1.78 parts is substantially the same except for a shorter rise time of 90 seconds.

EXAMPLE 3

A prepolymer is prepared by mixing 81.0 parts of a polyether polyol having an equivalent weight of about 1440 (obtained by condensing propylene oxide with trimethylol propane and capping with ethylene oxide so that about 85% of the hydroxyl groups are primary) and about 43.0 parts of the 4,4'-methylenebis(cyclohexyl isocyanate) isomer mixture described in Example 1. The mixture is heated at 100° C. for about 2 hours and then cooled to room temperature. The prepolymer has an —NCO content of about 9.0%.

Foam is prepared by a quasi-prepolymer procedure using the following formulation.

| | Parts |
|---|---|
| Prepolymer of this example | 124.0 |
| 4,4'-methylenebis(cyclohexyl isocyanate) of Example 1 | 24.8 |
| Polyether polyol described in this example | 19.0 |
| Surfactant described in Example 1 | 1.0 |
| Water | 3.72 |
| 2-decyl-1,1,3,3-tetramethyl guanidine | 1.02 |

The ingredients are added in the order shown and then mixed with a high-speed mixer for about 15 seconds. The resulting mixture is poured into an open container and allowed to foam. The foam rise time is about 100 seconds. The foam has a density of 2.5 lb./cu. ft. The cells are open and in the size range of 32–64 cells/linear inch. The compression set of the foam without curing is 21% and is not changed by curing for 1 hour at 120° C.

EXAMPLE 4

A one-shot foam is prepared by adding the ingredients in the following formulation in the order shown at 25° C. and agitating the resulting mixture for about 35 seconds with a high-speed mixer. The foam is allowed to rise in an open container.

| | Parts |
|---|---|
| Polyether triol, equivalent weight about 1000, prepared by condensing propylene oxide with trimethylol propane and capping with ethylene oxide | 90.0 |
| Surfactant described in Example 1 | 1.0 |
| Activator solution (prepared in advanced): | |
| Polyether triol described above | 10 |
| Dibutyltin di-2-ethylhexoate | 2 |
| Stannous 2-ethylhexoate | 2 |
| 2 - cyclohexyl - 1,1,3,3-tetramethyl guanidine | 0.89 |
| Water | 2.5 |
| 4,4' - methylenebis(cyclohexyl isocyanate) described in Example 1 | 50.0 |

The rise time for the foam is 2.8 minutes. The foam has a density of 3.5 lb./cu. ft. and it has an open cell structure with about 5 cells/linear inch. The compression set before curing is 14% and is unchanged by curing for 1 hour at 120° C. The tensile strength of this foam by hand test is moderately good but lower than the tensile strength observed for the prepolymer foams of Example 1.

EXAMPLE 5

A mixture of about 75 parts of a polyester polyol having an equivalent weight of about 1000 and a functionality of about 2.7 (obtained by esterification of adipic acid with a mixture of diethylene glycol and trimethylolpropane) and 53.7 parts of the liquid mixture of isomers of 4,4'-methylenebis(cyclohexyl isocyanate) described in Example 1 is prepared at room temperature in an agitated reactor. The mixture is heated to 100° C. and maintained at that temperature for about 1 hour. The resulting product is cooled to room temperature and stored in dry containers until required. The prepolymer has a free —NCO content of about 10.8%.

Six flexible foam samples are prepared from this prepolymer by a quasi-prepolymer procedure using different 2-alkyl-1,1,3,3-tetramethylguanidine derivatives as catalysts for the —NCO/water reaction. The foam formulation and procedure are substantially the same in all other respects for the six foam samples. The formulation used follows:

| | Parts |
|---|---|
| Prepolymer of this example | 128.7 |
| 4,4' - methylenebis(cyclohexyl isocyanate) isomer mixture described in Example 1 | 15.0 |
| Polyester polyol described in this example | 25.0 |
| Dimethylformamide | 15.0 |
| Silicone surfactant for flexible polyester foams sold by Union Carbide as "L–532." Described in Product Information Bulletin 50–6, "L–532, Silicone Surfactant for Polyester Urethane Foam Formation," February 1966, Union Carbide | 1.0 |
| Water | 3.6 |
| 2 - alkyl - 1,1,3,3 - tetramethylguanidine, as shown in Table II. | |

Foams are prepared batchwise by agitating the mixture obtained by adding the ingredients in the order shown in the above formulation for about 20–25 seconds with a laboratory high-speed mixer (approx. 3000 r.p.m.) and pouring the resulting mass into an open container where it is allowed to foam.

The specific catalysts used, amounts of catalyst used, rise times observed for foam formation and properties of the resulting foams are presented in Table II which follows.

TABLE II

| Catalyst, 2-alkyl group | Parts | Rise time, seconds | Density, lb./cu. ft. | Comp. Set B, percent cured 1 hr. at 120° C. |
|---|---|---|---|---|
| Ethyl | 0.91 | 160 | 1.9 | 38 |
| n-Butyl | 0.86 | 100 | 1.7 | 80 |
| n-Decyl | 1.1 | 100 | 1.7 | [1] 59 |
| β-Cyanoethyl | 1.15 | 85 | 1.8 | [1] 57 |
| β-Carbobutoxyethyl | 0.96 | 170 | 1.7 | 88 |
| β-Carbooctoxyethyl | 3.64 | 115 | 1.8 | 78 |

[1] Cured for 4 hours at 120° C.

With the exception of the foam prepared with the 2-n-decyl-1,1,3,3-tetramethylguanidine, the foams produced have sufficiently open cell structure that no shrinkage or only very slight shrinkage is observed. The foam prepared with the 2-decyl substituted catalyst is crushed to open its cells so as to avoid excessive shrinkage. The cell size in all samples is in the range of 32–64 cells/linear inch. The tensile strength of all the foams by hand test approaches or matches that of the commercial foam prepared from tolylene diisocyanate described in Example 1.

EXAMPLE 6

The following formulation is used to prepare a flexible polyurethane foam.

| | Parts |
|---|---|
| Prepolymer of Example 5 | 130.0 |
| 4,4'-methylenebis(cyclohexyl isocyanate) isomer mixture of Example 1 | 22.0 |
| Polyester polyol of Example 5 | 25.0 |
| Trichlorofluoromethane | 5.0 |
| Dimethylformamide | 15.0 |
| Silicone surfactant described in Example 5 | 1.0 |
| Water | 3.72 |
| 2-phenyl-1,1,3,3-tetramethylguanidine | 1.33 |

The ingredients are added in the order listed and the mixture agitated with a high-speed mixer for about 35 seconds and poured into an open container and allowed to foam. The rise time is about 175 seconds; there is no shrinkage and the cell structure is open with a cell size in the range of 32–64 cells/linear inch. The compression set is 41% after curing 8 hours at 120° C. Hand tensile is excellent.

EXAMPLE 7

A prepolymer is prepared by mixing 75.0 parts of the polyester polyol described in Example 5, with about 42.8 parts of 3 - isocyanatomethyl-3,5,5-trimethylcyclohexyl isocyanate and heating the resulting mixture for about 1 hour at 100° C. The prepolymer is cooled to room temperature. It has an —NCO content of 11.0%.

Foam is prepared from this prepolymer using the following formulation.

| | Parts |
|---|---|
| Prepolymer of this example | 117.8 |
| 3 - isocyanatomethyl - 3,5,5 - trimethylcyclohexyl isocyanate | 14.5 |
| Polyester polyol of Example 5 | 25.0 |
| Silicone surfactant of Example 5 | 1.0 |
| Water | 3.6 |
| 2 - cyclohexyl - 1,1,3,3 - tetramethylguanidine | 0.71 |

The ingredients are added in the order given to a suitable container and mixed for about 25 seconds. The foam has a rise time of about 230 seconds. The cell structure is open with cells of a size of about 32 cells/linear inch. The compression set is 75% after curing 1 hour at 120° C. Hand tensile is excellent.

EXAMPLE 8

A mixture of 468 parts of a polyether polyol having an equivalent weight of about 1480 (obtained by condensing propylene oxide with trimethylol propane and capping with ethylene oxide so that about 85% of the hydroxyl groups are primary) and about 232 parts of the liquid mixture of isomers of 4,4'-methylenebis(cyclohexyl isocyanate) described in Example 1 is prepared at room temperature in an agitated reactor. The mixture is heated to 100° C. and maintained at that temperature for about 1 hour, then cooled and stored in dry containers until required. The prepolymer has an —NCO content of about 8.7%.

Foam is prepared continuously from this prepolymer by feeding the following streams in the proportions indicated to the mixing head of a foam machine such as those described in HR-32, "Metering and Mixing Equipment for the Production of Urethane Foam Products" by S. A. Stewart, September 1958, E. I. du Pont de Nemours and Company, Wilmington, Del. The temperature of the streams fed to the foam machine is also given.

| Stream 1 (temperature 30° C.): | Parts |
|---|---|
| Prepolymer of this example | 100.0 |
| Methyl p-methoxybenzalmalonate | 1.0 |
| Tri-isodecyl phosphite | 2.0 |
| Surfactant, polydimethylsiloxane polyalkylene ether block copolymer described in Example I(a) of U.S. 2,834,748 | 0.1 |
| Stream 2 (temperature 30° C.): | |
| Water | 1.79 |
| Dimethylformamide | 10.0 |
| 2 - cyclohexyl-1,1,3,3-tetramethylguanidine | 0.3 |

The mixture issuing from the mixing head is directed into open containers and allowed to foam. The rise time for this formulation is 120 seconds. After standing for 7 days at 25° C. and 50% relative humidity, the foam has a density of 2.69 lb./cu. ft. and a tensile strength of 21 p.s.i. at a breaking elongation of 220%. The cell structure is uniform with fine, open cells. The compression set without any cure is only 17%. The properties reported are measured in accordance with the methods of ASTM D–1564 for flexible foams.

EXAMPLE 9

2 - decyl - 1,1,3,3 - tetramethylguanidine is obtained by the following procedure. To a solution of 23.0 g. of tetramethylurea in 100 ml. of benzene stirred under nitrogen and cooled in an ice bath is added dropwise a mixture of 30.6 g. of phosphorus oxychloride and 20 ml. of benzene at a rate such that the reaction temperature does not exceed 25° C. The reaction mixture is then allowed to stand overnight at room temperature. To this mixture is added dropwise a mixture of 20.8 g. of decylamine and 20 ml. of benzene while the temperature of the reaction mixture is held below 30° C. The reaction mixture is again allowed to stand overnight at room temperature. It is then added slowly to a chilled solution of 70 g. of potassium hydroxide in 200 ml. of water. The layers which form are separated. The aqueous layer is extracted with diethyl ether. The ether extract is added to the original organic layer and the mixture is dried over potassium hydroxide. The solvents are removed by distillation at reduced pressure. The residue is distilled under vacuum to give 24.0 g. of product, B.P. 127° C. at 0.4 mm. Hg. Calculated for $C_{15}H_{33}N_3$ (percent): C, 71.2; H, 13.0; N, 16.5. Found (percent): C, 71.0; H, 12.8; N, 15.9.

EXAMPLE 10

2-dodecyl-1,1,3,3-tetramethylguanidine is obtained by the following procedure. To a solution of 443.5 g. of tetramethylurea in 1 liter of benzene stirred under nitrogen and cooled in an ice bath is added dropwise a mixture of 584 g. of phosphorus oxychloride and 400 ml. of benzene at a rate such that the reaction temperature does not exceed 25° C. The reaction mixture is then allowed to stand overnight at room temperature. It is again cooled in an ice bath and to it is added dropwise a mixture of 709 g. of dodecylamine and 400 ml. of benzene at a rate such that the reaction temperature does not exceed 25° C. The reaction mixture is again allowed to stand overnight at room temperature. The resulting suspension is filtered and the filtrate is concentrated by distilling benzene from it at reduced pressure. The residue is dissolved in water and the solution made strongly basic with sodium hydroxide. The resulting suspension is extracted with fluorotrichloromethane. The solvent is removed from the extract under reduced pressure and the residue is distilled under vacuum to give 205 g. of product, B.P. 138–144° C. at 0.75 mm. Hg. Calculated for $C_{17}H_{37}N_3$ (percent): C, 72.2; H, 13.2; N, 14.8. Found (percent): C, 71.5; H, 13.0; N, 13.9.

Throughout the following coating composition examples, physical properties are measured as indicated below.

Sward Hardness—Sward Hardness Rocker, Official Digest, Federation of Paint and Varnish Production Clubs 26, 1030–1038 (1954). Standard Glass=100.

Pencil Hardness—ibid., 28, 232 (1956).

Stress-Stain Properties—ASTM D–412 cross head speed =2"/min.

EXAMPLE 11

To 112 parts of the 4,4'-methylenebis(cyclohexyl isocyanate) isomer mixture described in Example 1 is added a dry solution of 100 parts of polypropylene ether triol (equivalent weight 210, prepared by condensing propylene oxide with glycerol) in 318 parts of xylene. The mixture is heated at about 90° C. for about 4 hours until the theoretical NCO group assay of 3.02% by weight is reached. About 2 parts of 4,4'-butylidene-bis(6-tert-butyl-m-cresol) and 2 parts of methyl-p-methoxybenzal-malonate are dissolved in the resulting coating composition as stabilizers.

To three portions of this coating composition, 2-dodecyl-1,1,3,3-tetramethylguanidine is added in amounts of 0.25%, 0.50% and 1.0% by weight based on the total weight of coating composition. For comparison, 1.0% by weight of dibutyltin dilaurate is added to a fourth portion of the coating composition.

Drawn films of 3 mil wet thickness are prepared promptly from the 4 portions of catalyzed coating composition. The curing characteristics of the samples at 75° F. (24° C.) and 50% relative humidity are tabulated below:

| Catalyst | 2-dodecyl-1,1,3,3-tetramethylguanidine | | | Dibutyltin dilaurate |
|---|---|---|---|---|
| Catalyst level, percent | 0.25 | 0.50 | 1.0 | 1.0 |
| Estimated pot life, hrs | 22 | 20 | 15–18 | (¹) |
| Tack-free time, min | 55 | 42 | 15 | 90 |
| Sward hardness, after tack-free: | | | | |
| Immediately | 4 | 8 | 10 | 4 |
| 1 hour | 10 | | 20 | 6 |
| 3 hours | | | 20 | 26 | 18 |
| 1 day | 28 | 38 | 38 | 28 |
| 3 days | | | 52 | 38 |
| Pencil hardness, after tack-free: | | | | |
| Immediately | 6B | 6B | 4B | 6B |
| 1 hour | 5B | 3B | 2B | 5B |
| 3 hours | | | 2B | B | 4B |
| 3 days | B | B | B | B |

¹ Greater than 1 year.

Drawn films of 20 mil wet thickness are also prepared from the same 4 catalyzed coating compositions and cured for 1 week at 75° F. (24° C.) and 50% relative humidity. The physical properties of the resulting films are tabulated below.

| Catalyst | 2-dodecyl-1,1,3,3-tetramethylguanidine | | | Dibutyltin dilaurate |
|---|---|---|---|---|
| Catalyst level, percent | 0.25 | 0.5 | 1.0 | 1.0 |
| Tensile strength, p.s.i | 4,765 | 4,315 | 4,350 | 4,315 |
| Elongation at break, percent | 110 | 120 | 95 | 120 |
| 100% modulus, p.s.i | 4,385 | 3,500 | | 4,050 |

EXAMPLE 12

To a mixture of 77.3 parts of 3-isocyanatomethyl-3,5,5-trimethylcyclohexyl isocyanate, 123 parts of a moderately branched polyester polyol having a hydroxyl number of about 165 and an aquivalent weight of 340 (prepared from ethylene glycol trimethylolpropane and adipic acid), 150 parts of xylene and 150 parts of 2-ethoxyethyl acetate is added 0.005 part of dibutyltin dilaurate. The mixture is heated for 3 hours at 80° C. The resulting moisture cure coating composition has an NCO group assay of 3.09%.

To one portion of this coating composition, 2-cyclohexyl-1,1,3,3-tetramethylguanidine is added in an amount corresponding to 0.4% by weight based on the total weight of coating composition. For comparison, 0.4% by weight of dibutyltin dilaurate is added to a second portion of the coating composition.

Drawn films of 3 mil wet thickness are prepared promptly from the 2 portions of catalyzed coating composition. The curing characteristics of the samples at 75° F. (24° C.) and 50% relative humidity are tabulated below.

| | Cyclohexyl tetramethyl guanidine | Dibutyltin dilaurate |
|---|---|---|
| Tack-free time, hr | 2 | 5 |
| Sward hardness, after tack-free: | | |
| Immediately | 18 | 6 |
| 24 hrs | 36 | 24 |
| 72 hrs | 38 | 50 |
| Pencil hardness, after tack-free: | | |
| Immediately | H | 2B |
| 1 hr | H | 2B |
| 3 hrs | H | H |
| 24 hrs | 5H | 2H |
| 72 hrs | 6H | 3H |

Drawn films of 20 mil wet thickness are also prepared from the 2 catalyzed coating compositions and cured for 1 week at 75° F. (24° C.) and 50% relative humidity. The physical properties of the resulting films are tabulated below.

| | Cyclohexyl tetramethyl guanidine | Dibutyltin dilaurate |
|---|---|---|
| Tensile strength, p.s.i | 4,650 | 4,800 |
| Elongation at break, percent | 100 | 130 |
| 100% modulus, p.s.i | 4,640 | 4,235 |

What is claimed is:

1. In a process for preparing an open-cell flexible polyurethane polyurea foam which comprises (1) reacting $x$ equivalents of an aliphatic polyisocyanate, wherein $x$ is about 2.0–10.5, with about one equivalent of a polyether polyol having an average equivalent weight of at least about 500 to prepare an isocyanato-terminated prepolymer, (2) adding to said prepolymer about 0–1 equivalent of a polyol of step 1, about 1–10 parts by weight of water per 100 parts of total polyol, and $y$ equivalents of said aliphatic polyisocyanate, with the proviso that the total equivalents of aliphatic polyisocyanate used $(x+y)$ provides about 0.7–1.3 isocyanato groups per equivalent of polyol plus water present; the improvement which consists essentially of carrying out the water isocyanato-group reaction in the presence of at least one substituted guanidine of the formula

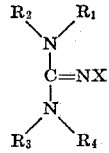

wherein $R_1$, $R_2$, $R_3$, and $R_4$ are independently $C_1$–$C_4$ alkyl, substituted $C_1$–$C_4$ alkyl wherein the substituent is at least one $C_1$–$C_4$ alkoxy, or the radicals in one or both of the pairs $R_1$–$R_2$ and $R_3$–$R_4$ are joined together to form a 5 to 7 membered ring consisting of carbon atoms and not more than 2 hetero atoms, including the guanidine nitrogen atom, from the group consisting of nitrogen, sulfur, and oxygen and X is $C_4$–$C_{18}$ alkyl, $C_5$–$C_7$ cycloalkyl, phenyl or substituted phenyl wherein the substituents are $C_1$–$C_{12}$ alkyl or $C_1$–$C_4$ alkoxy.

2. A process of claim 1 wherein the substituted guanidine catalyst is at least one of 2-cyclohexyl-1,1,3,3-tetramethylguanidine, 2 - n-decyl-1,1,3,3-tetramethylguanidine or 2-n-dodecyl-1,1,3,3-tetramethylguanidine.

3. A process of claim 1 wherein the aliphatic polyisocyanate is 4,4'-methylenebis(cyclohexyl isocyanate) which is a liquid at 25° C.

4. A process of claim 1 wherein the polyol is a polyalkyleneether polyol having an average equivalent weight of about 900–2000.

5. A process of claim 1 wherein the water is employed in the amount of about 2–5 parts by weight per 100 parts of polyol.

6. A process of claim 1 wherein $x$ is at least about 2.5, the polyol is a polyester polyol having an average equivalent weight of about 900–1500 of which about 40–90% by weight is added in step 1 to prepare the prepolymer.

7. A process of claim 6 wherein the substituted guanidine catalyst is at least one of 2-cyclohexyl-1,1,3,3-tetramethylguanidine, 2-decyl-1,1,3,3-tetramethylguanidine or 2-dodecyl-1,1,3,3-tetramethylguanidine.

8. A process of claim 1 wherein the polyol is a polyalkyleneether polyol, substantially all of which is added in step 1 to prepare the prepolymer.

9. A process of claim 8 wherein the catalyst is at least one of 2-cyclohexyl-1,1,3,3-tetramethylguanidine, 2-decyl-1,1,3,3 - tetramethylguanidine or 2 - dodecyl-1,1,3,3-tetramethylguanidine.

10. A process of claim 9 wherein the polyol has an average functionality of at least about 2.2 hydroxy groups per molecule and the polyisocyanate is 4,4'-methylene-bis(cyclohexyl isocyanate) which is a liquid at about 25° C.

11. A process for covering a substrate with a moisture-cure polyurethane coating which consists essentially of applying a solution of an aliphatic isocyanato-terminated polyurethane prepolymer in an inert solvent in combination with about 0.05-2.0% by weight, based on the total weight of the coating composition, of a substituted guanidine of the formula

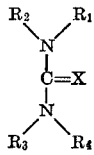

wherein $R_1$, $R_2$, $R_3$, and $R_4$ are independently $C_1$–$C_4$ alkyl, substituted $C_1$–$C_4$ alkyl wherein the substituent is at least one $C_1$–$C_4$ alkoxy, or the radicals in one or both of the pairs $R_1$–$R_2$ and $R_3$–$R_4$ are joined together to form a 5 to 7 membered ring consisting of carbon atoms and not more than 2 hetero atoms, including the guanidine nitrogen atom, from the group consisting of nitrogen, sulfur, and oxygen and X is $C_4$–$C_{18}$ alkyl, $C_5$–$C_7$ cycloalkyl, phenyl or substituted phenyl wherein the substituents are $C_1$–$C_{12}$ alkyl or $C_1$–$C_4$ alkoxy.

12. A process of claim 11 wherein the isocyanato-terminated polyurethane prepolymer is prepared by mixing about 1.4–2.1 equivalents of an aliphatic polyisocyanate with about 1 equivalent of at least one polyol having a functionality of about 2–4 and an average equivalent weight of about 90–560.

13. A process of claim 12 wherein the polyol is a mixture of a polyalkyleneether polyol and a polyol having a molecular weight below about 350.

14. A process of claim 12 wherein the aliphatic polyisocyanate is 4,4'-methylenebis(cyclohexyl isocyanate) which is a liquid at 25° C.

15. A process of claim 12 wherein the substituted guanidine catalyst is at least one of 2-cyclohexyl-1,1,3,3-tetramethylguanidine, 2 - n-decyl-1,1,3,3-tetramethylguanidine or 2-n-dodecyl-1,1,3,3-tetramethylguanidine.

16. A process of claim 13 wherein the substituted guanidine is at least one of 2-cyclohexyl-1,1,3,3-tetramethylguanidine, 2-n-decyl-1,1,3,3-tetramethylguanidine or 2-n-dodecyl-1,1,3,3-tetramethylguanidine.

17. A process of claim 16 wherein the aliphatic polyisocyanate is 4,4'-methylenebis(cyclohexyl isocyanate) which is a liquid at 25° C.

18. A process of claim 17 wherein the substituted guanidene is 2-dodecyl-1,1,3,3-tetramethylguanidine.

References Cited

UNITED STATES PATENTS

| | | | |
|---|---|---|---|
| T858,022 | 1/1969 | Fogiel | 260—2.5 |
| 3,215,645 | 11/1965 | Flynn | 260—2.5 |
| 3,238,154 | 3/1966 | Mosso | 260—2.5 |
| 3,436,361 | 4/1969 | Wooster | 260—77.5 |

DONALD E. CZAJA, Primary Examiner

E. C. RZUCIDLO, Assistant Examiner

U.S. Cl. X.R.

260—2.5 AT, 75 NC, 75 NT, 77.5 AC, 77.5 AT